(12) United States Patent
Lopushansky et al.

(10) Patent No.: US 7,443,510 B2
(45) Date of Patent: Oct. 28, 2008

(54) TUNABLE LASER FOR DYNAMIC MEASUREMENT

(75) Inventors: Richard L. Lopushansky, The Woodlands, TX (US); Larry A. Jeffers, Minerva, OH (US); John W. Berthold, Salem, OH (US)

(73) Assignee: Davidson Instruments Inc., The Woodlands, TX (US)

( * ) Notice: Subject to any disclaimer, the term of this patent is extended or adjusted under 35 U.S.C. 154(b) by 92 days.

(21) Appl. No.: 11/314,952

(22) Filed: Dec. 21, 2005

(65) Prior Publication Data

US 2006/0238775 A1 Oct. 26, 2006

Related U.S. Application Data

(60) Provisional application No. 60/637,967, filed on Dec. 21, 2004.

(51) Int. Cl.
*G01B 9/02* (2006.01)
(52) U.S. Cl. ........................ 356/480; 356/519
(58) Field of Classification Search ................ 356/35.5, 356/454, 480, 519; 385/12
See application file for complete search history.

(56) References Cited

U.S. PATENT DOCUMENTS 5,276,501 A 1/1994 McClintock et al.
6,118,534 A 9/2000 Miller
6,549,687 B1 * 4/2003 Kochergin et al. ............ 385/12
6,724,785 B1 4/2004 Tucker et al.
6,870,867 B2 3/2005 Pontis et al.
2003/0081875 A1 1/2003 Kochergin et al.
2005/0094151 A1 5/2005 Pang et al.

FOREIGN PATENT DOCUMENTS

WO WO 98/35203 8/1998

OTHER PUBLICATIONS

EPO Search Report, Mar. 27, 2006, Lopushansky et.

* cited by examiner

*Primary Examiner*—Michael A Lyons
(74) *Attorney, Agent, or Firm*—McDonald Hopkins LLC; Risto Pribisich; Robert H. Earp, III

(57) ABSTRACT

A method for monitoring changes in a gap which corresponds to changes in a particular environmental parameter using a tunable laser and interferometer at high frequency is disclosed. The laser light provided to the interferometer is swept through a small range of wavelengths. Light modulated by the interferometer is detected and a non-sinusoidal light intensity output curve is created, a reference point on the curve identified and subsequent sweep of the laser performed. The difference in time, wavelength, or frequency at the occurrence of the reference point between the two sweeps allows for measuring the relative changes in the gap and, as a result, the change in the environmental parameter.

18 Claims, 6 Drawing Sheets

TUNABLE LASER FOR DYNAMIC MEASUREMENT

This application claims priority from U.S. Provisional Patent Application Ser. No. 60/637,967, filed Dec. 21, 2004.

FIELD AND BACKGROUND OF THE INVENTION

The present invention is generally related to tunable lasers, and more particularly to tunable lasers used for optical measurements in a dynamic environment.

Among other things, tunable lasers find utility in measurements relying upon the observation of light reflected or transmitted from a sensor using a Fabry-Perot interferometer. In such methods, the Fabry-Perot gap will move through a range of displacements, and the displacement range of the sensor is defined by the tuning range of the laser. Sensors with small gaps require lasers with a large tuning range and sensors with large gaps require lasers with a small tuning range.

For example, in co-pending U.S. patent application Ser. No. 11/105,651, entitled Method and Apparatus for Continuous Readout of Fabry-Perot Fiber Optic Sensor, Applicant disclosed a tunable laser with 40 nm tuning range as the light source to use for measurement of the absolute gap distance of a Fabry-Perot sensor with gaps ranging from 60 to 80 μm. The time required for a laser to sweep through a 40 nm tuning range is acceptable for making absolute measurements of static environmental parameters such as downhole oil and gas applications but far too slow for making relative measurements of dynamic environmental parameters such as engines and turbines. In the current prior art, time periods greater than 100 ms are needed to tune a laser through a 40 nm range. Thus any process to be measured with a Fabry-Perot sensor that changes in times shorter than 100 ms (10 Hz) cannot be measured with such a laser.

In U.S. Pat. No. 5,276,501 to McClintock et al. another tunable laser method is described. In this case, the method requires observation of two separate references points on the output curve of the detector associated with the interferometric sensor as a tunable laser is swept through its range of wavelengths. Moreover, McClintock assumes that this curve must be sinusoidal in nature (according to a two-beam interferometric model). As shown in the description of one embodiment of the invention, the teachings and assumptions in McClintock ultimately limit the operation and capabilities of the system and method described in McClintock.

DESCRIPTION OF THE DRAWINGS

Objects and advantages together with the operation of the invention may be better understood by reference to the following detailed description taken in connection with the following illustrations, wherein:

In FIG. 3a, a low finesse sensor with a static gap is used and the minima occur at the same wavelength and time in each sweep of the laser. In FIG. 3b, a high finesse sensor is used with a static gap, and the minima occur at the same wavelength and time in each sweep of the laser. In FIG. 3c, a low finesse sensor is shown where the gap is changing, and the minima occur at a different wavelength and time in each sweep of the laser. In FIG. 3d, a high finesse sensor has a changing gap, and the minima occurs at a different wavelength and time in each sweep of the laser.

DETAILED DESCRIPTION

While the present invention is described with reference to the preferred embodiment, it should be clear that the present invention should not be limited to this embodiment. Therefore, the description of the preferred embodiment herein is illustrative of the present invention and should not limit the scope of the invention as claimed. Additional objects and advantages of the invention will be set forth in the description which follows, and in part will be obvious from the description, or may be learned by practice of the invention.

Figure 1:
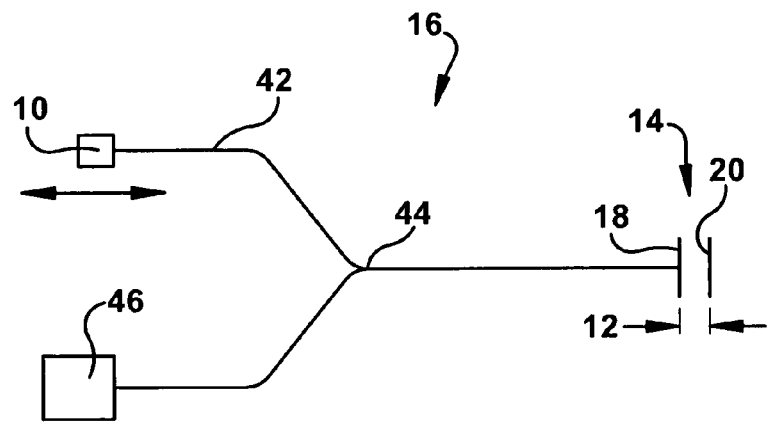
FIG. 1 is a schematic representation of sensor and optoelectronics of the present invention.
Figure 2:
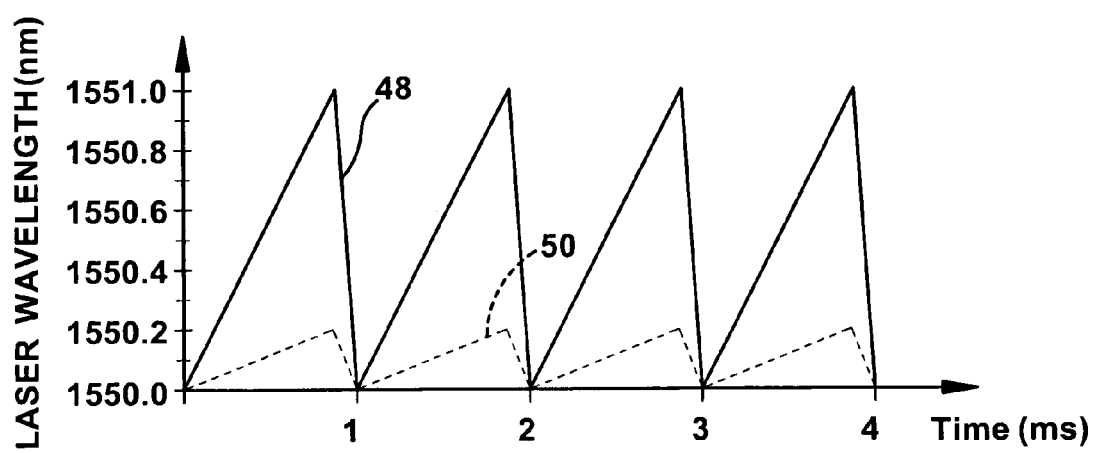
FIG. 2 is a graphical representation of tuning ranges versus time for two different lasers.
Figure 3A:
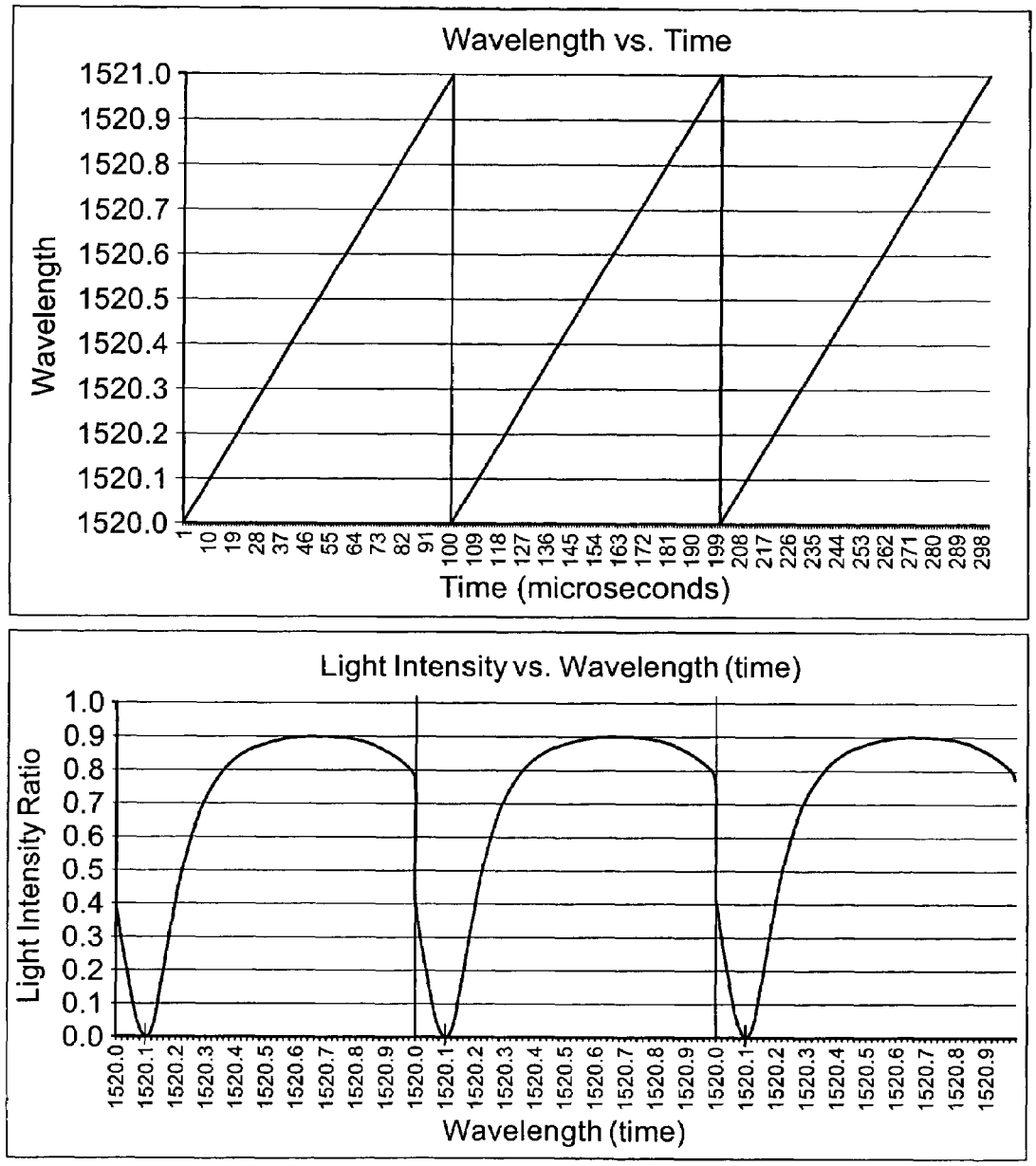
FIGS. 3a-3d are graphical representations of non-sinusoidal light intensity output curves generated by sensor (shown in the lower plot of each Figure) as the laser is tuned through the corresponding range (shown in the upper plot of each Figure).
Figure 3B:
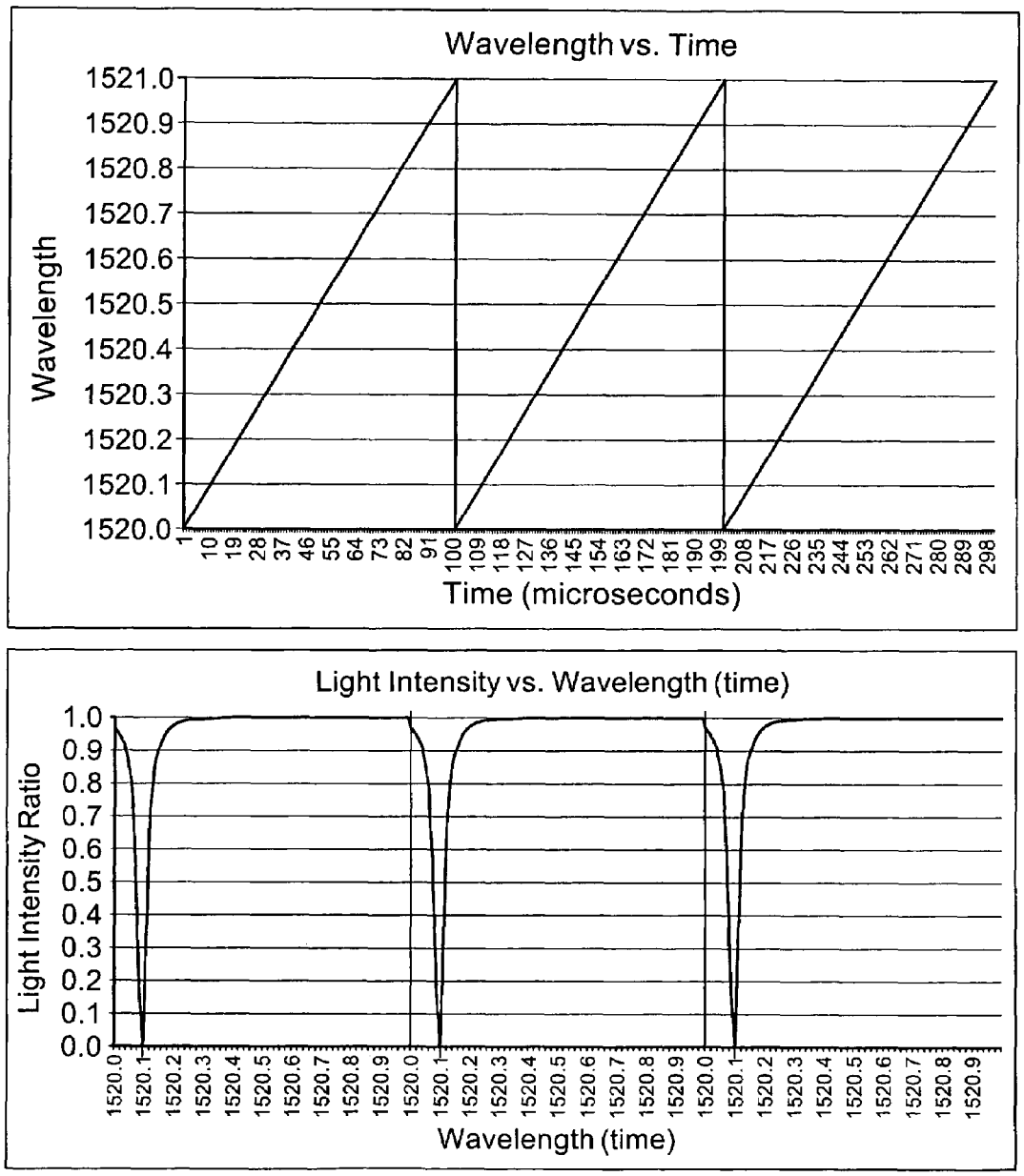
Figure 3C:
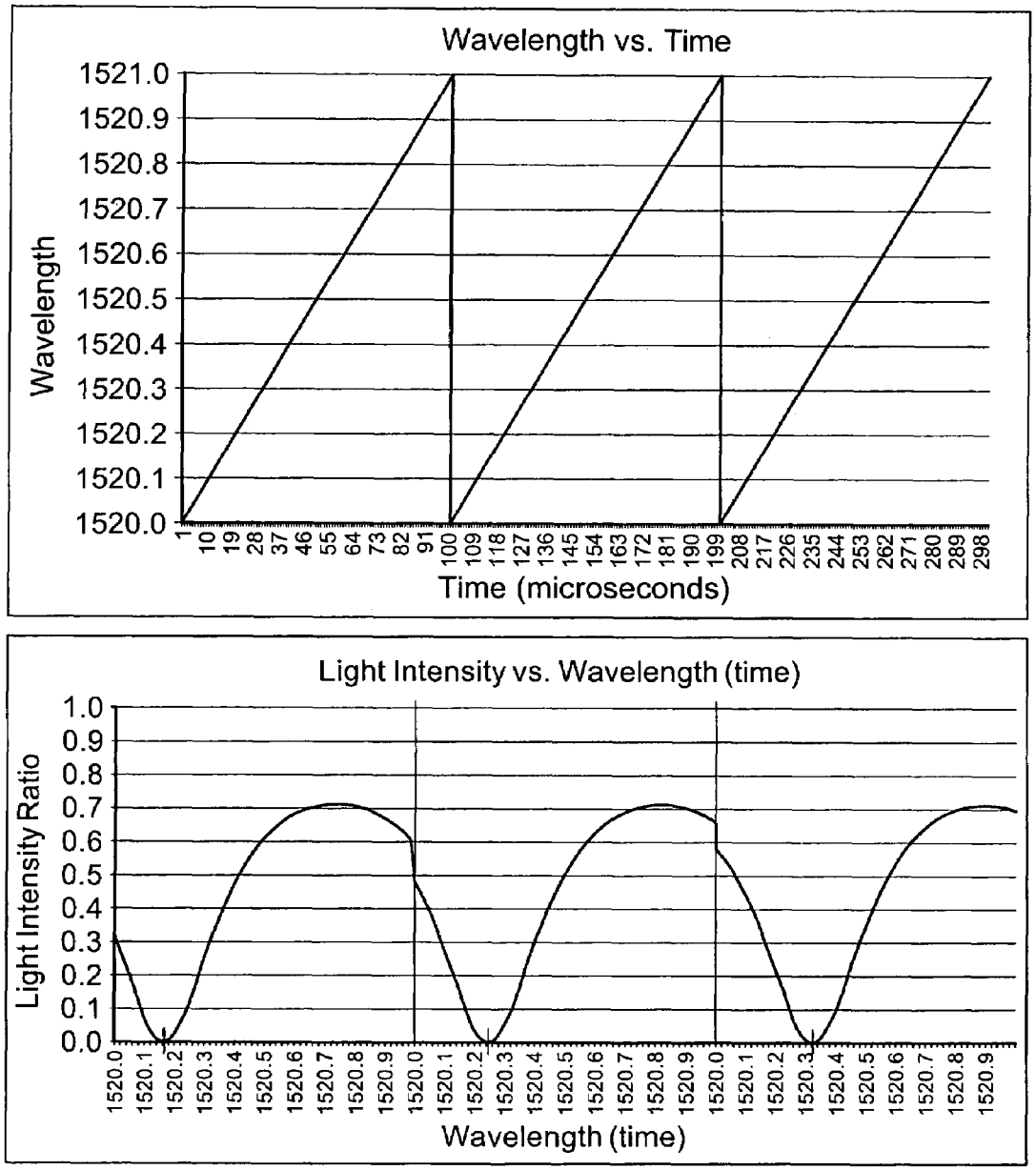
Figure 3D:
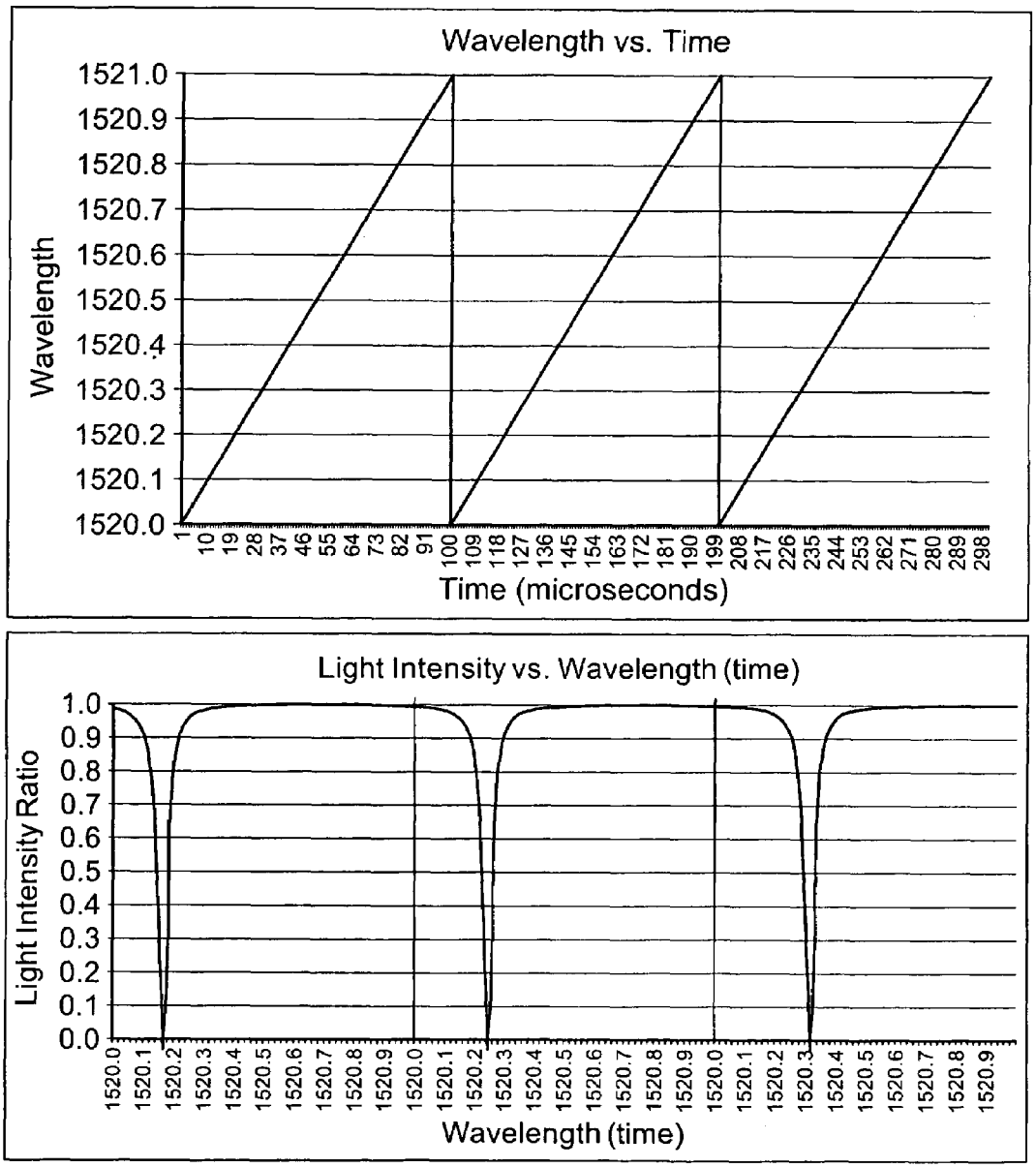

Reference will now be made in detail to the preferred embodiment of the invention as illustrated in the accompanying drawings. The present invention discloses a new approach for using a tunable laser source 10 to make measurements of a Fabry-Perot gap 12 that is dynamically changing. The Fabry-Perot sensor 14 and optoelectronic configuration 16 is shown in FIG. 1 and the laser-tuning characteristic is shown in FIG. 2. As illustrated in FIG. 1, the gap 12 in the Fabry-Perot sensor 14 is formed by a pair of at least partially reflective elements 18, 20. In one embodiment, the reflective elements 18, 20 may be partially reflective mirrors separated by the gap 12.

This approach requires a tunable laser source 10 such as a tunable laser that can provide rapid switching in fine increments or continuous sweeping over a narrow band of wavelengths with temporal repeatability. The laser 10 may be tunable over any spectral band such as the infrared spectral band from 1500 to 1600 nm.

Notably, the sensor gap 12 is configured to be long so that a laser with a small tuning range may be used and the sweep rate may be rapid. Thus, the system described herein is capable of operating at much faster rates than previously known systems increasing the frequency response from 2 Hz to over 1000 Hz. Although it would be necessary to tune the laser 10 through at least two minima in the interference pattern if an absolute measurement were desired, the laser 10 only need be tuned through one minimum to make a relative measurement of changes in the gap 12.

Note that the tuning range varies inversely with the length of the Fabry-Perot gap 12:

$$\Delta v = c/2G \quad (1)$$

where $\Delta v$ is the tuning range in Hz for a gap $G=30$ μm.

For a laser 10 operating at 1550 nm, a tuning range of 40 nm in wavelength corresponds to a tuning range $\Delta v = 5 \times 10^{12}$ Hz. If the gap 12 is increased by 40 times from 30 μm to 1200 μm=1.2 mm, then the laser tuning range is reduced 40 times so that $\Delta v = 125 \times 10^9$ Hz. In wavelength space, assuming a 1550 nm light source, the corresponding tuning range would be reduced from 40 nm to 1 nm. The sensor gap 12 may consist of a fiber 22 with an embedded reflector 24 as shown in FIG. 4 or a fiber 26 coupled to a collimating lens 28 as shown in FIG. 5.

Figure 4:
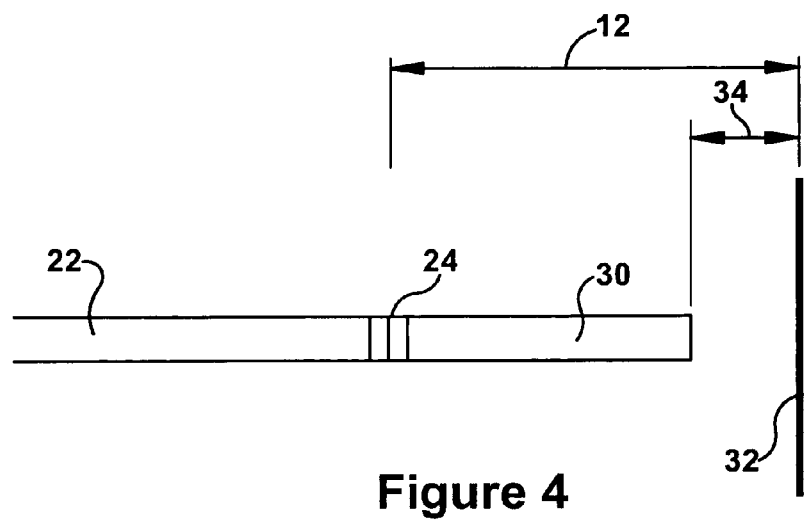
FIG. 4 is a schematic representation of a long gap sensor with an embedded reflector.

In an embodiment, as illustrated in FIG. 4, the optical fiber 22 may be a single mode fiber and the embedded reflector 24 may be a fiber Bragg grating 24. The optical fiber 22 may have a numerical aperture of 0.1. A single mode light containment waveguide 30 may extend from the fiber Bragg grating 24, and a reflective element 32 may be positioned a distance 34 away from the free end of the waveguide 30. In an embodiment, the distance 34 between the free end of the waveguide 30 and the reflective element 32 may be 20 μm or less. The Fabry-Perot gap 12 may be formed between the fiber Bragg grating 24, which acts as the first reflective surface of the gap 12, and the reflective element 32, which acts as the second reflective surface of the gap 12. In an embodiment, the gap 12 may be approximately 1.2 mm.

Figure 5:
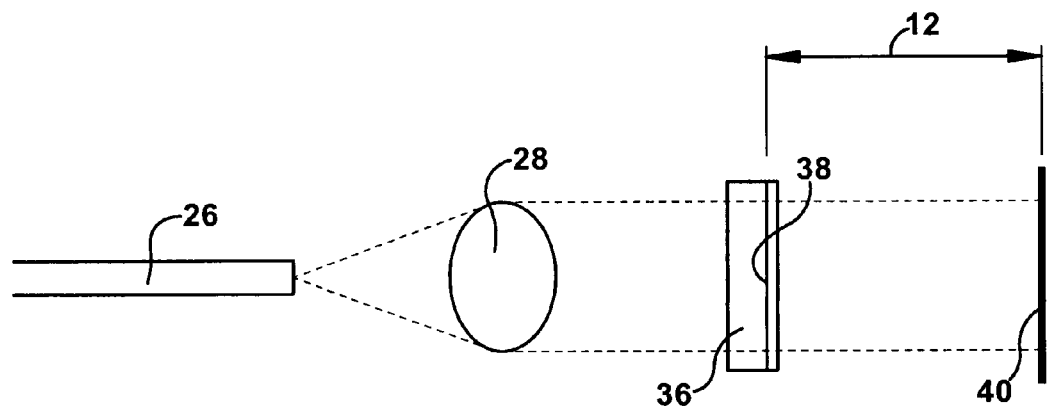
FIG. 5 is a schematic representation of a long gap sensor coupled to a collimating lens.

In an embodiment, as illustrated in FIG. 5, the optical fiber 26 may be either a multimode or single mode fiber. The optical fiber 26 may have a numerical aperture equal to 0.2. A substrate 36, such as a glass window, is positioned proximate to the end of the optical fiber 26. A reflector 38 may be located on one side of the substrate 36 to form the first reflective surface of the Fabry-Perot gap 12, and a reflective element 40 may be positioned a distance away from the reflector 38 to form the second reflective surface of the Fabry-Perot gap 12. In an embodiment, the Fabry-Perot gap 12 may be approximately 1.2 mm. The collimating lens 28 may be positioned to direct light from the optical fiber 26 to the Fabry-Perot gap 12 and to receive light reflected from the Fabry-Perot gap 12.

Lasers are available and can be swept over the range at 1 k Hz rates with a 200 pm tuning range and 0.2 pm resolution and with a 1000 pm range and 1 pm resolution. Thus, use of a high-speed tunable laser makes possible the application of Fabry-Perot sensors in processes where changes are taking place on millisecond time scales (1000 Hz rates).

The trade-off with high-speed tunable lasers is the uncertainty in the laser wavelength and this uncertainty determines the resolution of the system. If a laser is tuned over 1 nm in 1 millisecond and the desired resolution is 0.1%, then the laser wavelength must be repeatable to better than 1 pm.

A schematic of this configuration 16 is shown in FIG. 1. Infrared light from the laser 10 is injected into a multimode (or single mode) optical fiber 42. It passes through a power splitter 44 and to a Fabry-Perot sensor 14 and returns to a photodiode detector 46 where the light signal is converted to a photocurrent and amplified for processing in a signal conditioner (not shown) connected to the detector 46. The photodiode material may be InGaAs for detection of infrared light at 1550 nm.

FIG. 2 shows exemplary plots of the preferred laser tuning. Notably, the laser tuning must be controllable and repeatable. That is, each sweep of the desired wavelength range from $\lambda_1$ to $\lambda_2$ must start and stop at times that are known precisely. Notably, $\lambda_1$ and $\lambda_2$ should be selected to maximize the speed of operation. In an embodiment illustrated by FIG. 2, a plot 48 of the wavelength of laser light over time shows a range of 1000 pm, i.e., $\lambda_1$ equal to 1550.0 nm and a $\lambda_2$ 1551.0 nm, with a resolution of 1 pm. The sweep through the 1000 pm range is 1 ms in duration and may be continuously repeated. In another embodiment illustrated by FIG. 2, a plot 50 of the wavelength of laser light over time shows a range of 200 pm, i.e., $\lambda_1$ equal to 1550.0 nm and a $\lambda_2$ 1550.2 nm, with a resolution of 0.2 pm. The sweep through the 200 pm range is 1 ms in duration and may be continuously repeated. While exemplary values for $\lambda_1$ and $\lambda_2$ are disclosed herein, other values are possible depending upon the particulars of the intended application.

The light intensity reflected back to the signal conditioner from the Fabry-Perot gap 12 is modulated as the gap 12 changes. The ratio of the incident-to-reflected intensity IR is a function of both the laser frequency and the gap 12 and is given by:

$$IR(v, G) = \frac{F \sin^2[(2\pi v G)/c]}{1 + F \sin^2[(2\pi v G)/c]} \quad (2)$$

where:
  $c = \Delta v$ is the velocity of light
  $v = 1.93 \times 10^{14}$ Hz is the frequency of the infrared light
  $\lambda = 1550 \times 10^{-9}$ m (1550 nm) is the wavelength
  G is the Fabry-Perot gap distance
  $F = 4R/(1-R)^2$
  $R = (R1*R2)^{1/2}$ is the composite reflectance FIGS. 3a-3d show exemplary plots of the non-sinusoidal light intensity output curve (IR(v,G)) in varying situations, along with the corresponding plot of the laser light tuning. As the laser is tuned through its range (see the upper plot in each figure), for any given gap G, the reflected intensity ratio measured by the photodiode will appear as in the lower plot. Although the minimum intensity value is the preferred feature, software can be instructed to locate any feature (i.e., a reference point) on the intensity output curve. For each sweep of the laser, the precise time after the beginning of the sweep at which the feature occurs in the intensity ratio IR(v,G) is used to determine the relative gap of the sensor. Time correlates with laser wavelength/frequency, and time, wavelength, or frequency may be used to determine the relative gap of the sensor. The change in the gap between any two sweeps can be determined by measuring the difference in precise location of the feature in time, wavelength, or frequency. The absolute value of the gap is not important in this application, only changes that occur in the gap between each subsequent sweep of the laser. The system output consists of only dynamic changes in gap where the frequency response is as fast as the laser sweep rate (1 kHz in this example).

The smallest change (resolution) in the gap δG that can be measured is determined from Equation 3, where G is the gap.

$$\delta G/G = \delta v/v \quad (3)$$

The incremental change (resolution) in laser frequency is (1/1000) of the tuning range, which is 125 GHz in this example. The laser frequency $v = 193.5 \times 10^{12}$ and using Equation 3, δG is calculated to be:

$\delta G = (1.2 \times 10^{-3})(1.25 \times 10^{8})/(193.5 \times 10^{12})$ $\delta G = 775$ pm

| Tuning Range | $1.25 \times 10^{11}$ Hz or 1000 pm at 1550 nm wavelength |
| --- | --- |
| Tuning Resolution | $1.25 \times 10^{8}$ Hz or 1 pm at 1550 nm wavelength |
| Gap Displacement Range | 775 nm |
| Gap Resolution | 775 pm |

Having thus described the invention, we claim:

1. A method for monitoring variations to an environmental parameter comprising:
   providing an interferometer having a gap distance that changes in response to said variations in said environmental parameter;
   providing light from a light source to said interferometer spanning said gap distance, said light source having a range of wavelengths and said interferometer modulating said light to form modulated light, where characteristics of said modulated light change in response to changes in said gap distance;

varying wavelength of said light provided to said interferometer by sweeping said light source through said range of wavelengths from $\lambda_1$ to $\lambda_2$, wherein $\lambda_1$ and $\lambda_2$ are selected so that a first non-sinusoidal intensity output curve is generated from analyzing said modulated light, where said first non-sinusoidal light intensity output curve does not complete a full cycle;

identifying not more than one reference point on said first non-sinusoidal light intensity output curve;

subsequently repeating said sweeping of said light source provided to said interferometer from $\lambda_1$ to $\lambda_2$ so that a second non-sinusoidal light intensity output curve is generated that does not complete a full cycle;

identifying not more than one reference point on said second non-sinusoidal light intensity output curve that corresponds to said not more than one reference point on said first non-sinusoidal light intensity output curve;

observing changes between said reference point of said first non-sinusoidal light intensity output curve and said reference point of said second non-sinusoidal light intensity output curve; and producing an output indicative of variations in said environmental parameter based on said observed changes.

2. A method according to claim 1 wherein $\lambda_1$ is between 1500 nm and 1600 nm.

3. A method according to claim 1 wherein said reference point on said first non-sinusoidal light intensity output curve relates to a wavelength of said light during said sweeping of said light source and said reference point on said second non-sinusoidal light intensity output curve relates to a wavelength of said light during subsequent sweeping of said light source.

4. A method according to claim 1 wherein said reference point on said first non-sinusoidal light intensity output curve relates to a frequency of said light during said sweeping of said light source and said reference point on said second non-sinusoidal light intensity output curve relates to a frequency of said light during subsequent sweeping of said light source.

5. A method according to claim 1 wherein said reference point on said first non-sinusoidal light intensity output curve relates to a point in time during said sweeping of said light source and said reference point on said second non-sinusoidal light intensity output curve relates to a point in time during subsequent sweeping of said light source.

6. A method according to claim 1 wherein said reference point on said first non-sinusoidal light intensity output curve resides at a minimum or maximum on said first non-sinusoidal light intensity output curve and said reference point on said second non-sinusoidal light intensity output curve resides at a minimum or maximum on said second non-sinusoidal light intensity output curve.

7. A method according to claim 1, further comprising focusing said light provided to said interferometer with a collimating lens.

8. A method for determining changes in a gap distance of an interferometer comprising:

positioning said interferometer so that said gap distance changes in response to variations in an environmental parameter;

providing light to said interferometer and varying wavelength of light from a minimum wavelength to a maximum wavelength over a first sweep time period;

capturing a first light intensity ratio data set from light modulated by said interferometer over said first sweep time period;

identifying a first reference datum from said first light intensity ratio data set;

providing light to said interferometer and varying wavelength of light from said minimum wavelength to said maximum wavelength over a second sweep time period that is equal in duration to said first sweep time period;

capturing a second light intensity ratio data set from light modulated by said interferometer over said second sweep time period;

identifying a second reference datum from said second light intensity ratio data set; and determining change in said gap from said first sweep time period to said second sweep time period by analyzing said first reference datum and said second reference datum.

9. The method according to claim 8 further comprising setting said minimum wavelength to between 1500 nm and 1600 nm.

10. The method according to claim 8 where said first reference datum is a minimum wavelength of said first intensity ratio data set and said second reference datum is a minimum wavelength of said second intensity ratio data set, method further comprising:

associating said first reference datum with a first point in time during said first sweep time period;

associating said second reference datum with a second point in time during said second sweep time period; and determining a difference between said first point in time and said second point in time.

11. The method according to claim 8 where said first reference datum is a minimum frequency of said first intensity ratio data set and said second reference datum is a minimum frequency of said second intensity ratio data set, further comprising:

associating said first reference datum with a first point in time during said first sweep time period;

associating said second reference datum with a second point in time during said second sweep time period; and determining a difference between said first point in time and said second point in time.

12. The method according to claim 8 where said first reference datum is a maximum wavelength of said first intensity ratio data set and said second reference datum is a maximum wavelength of said second intensity ratio data set, method further comprising:

associating said first reference datum with a first point in time during said first sweep time period;

associating said second reference datum with a second point in time during said second sweep time period; and determining a difference between said first point in time and said second point in time.

13. The method according to claim 8 where said first reference datum is a maximum frequency of said first intensity ratio data set and said second reference datum is a maximum frequency of said second intensity ratio data set, further comprising:

associating said first reference datum with a first point in time during said first sweep time period;

associating said second reference datum with a second point in time during said second sweep time period; and determining a difference between said first point in time and said second point in time.

14. The method according to claim 8 where said varying of said light provided to said interferometer from said minimum wavelength to said maximum wavelength is proportional to time.

15. The method according to claim 14 where said varying of said light is provided to said interferometer from said minimum wavelength to said maximum wavelength is linearly proportional to time.

16. The method according to claim 8 further comprising focusing said light with a collimating lens.

17. The method according to claim 8 wherein said first reference datum is a datum captured at inception or conclusion of said first sweep time period.

18. The method according to claim 8 wherein said second reference datum is a datum captured at inception or conclusion of said second sweep time period.

* * * * *

UNITED STATES PATENT AND TRADEMARK OFFICE
CERTIFICATE OF CORRECTION

| | | |
|---|---|---|
| PATENT NO. | : 7,443,510 B2 | |
| APPLICATION NO. | : 11/314952 | |
| DATED | : October 28, 2008 | |
| INVENTOR(S) | : Richard L. Lopushansky, Larry A. Jeffers and John W. Berthold | |

It is certified that error appears in the above-identified patent and that said Letters Patent is hereby corrected as shown below:

Column 4, line 10, delete "$c=\Delta v$" and insert --$c=\lambda v$--

Signed and Sealed this

Fifteenth Day of September, 2009

David J. Kappos
*Director of the United States Patent and Trademark Office*